J. J. ROHAN.
ELECTRICALLY HEATED RADIATOR.
APPLICATION FILED MAR. 23, 1918.
1,276,573.
Patented Aug. 20, 1918.
2 SHEETS—SHEET 1.
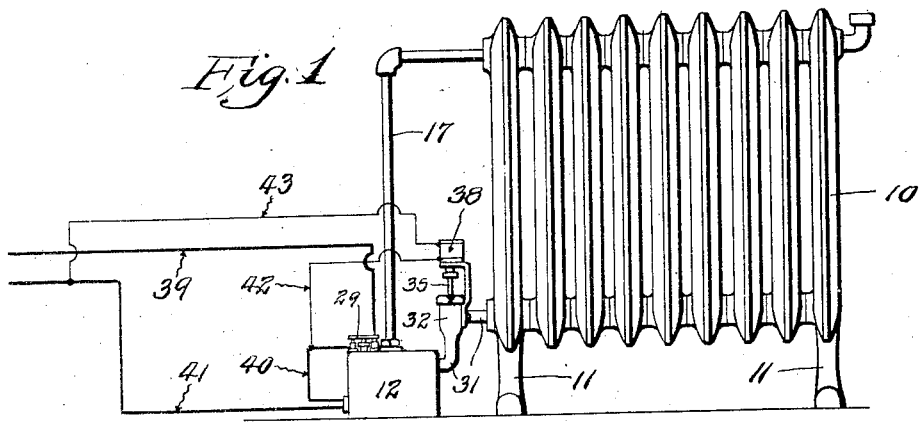
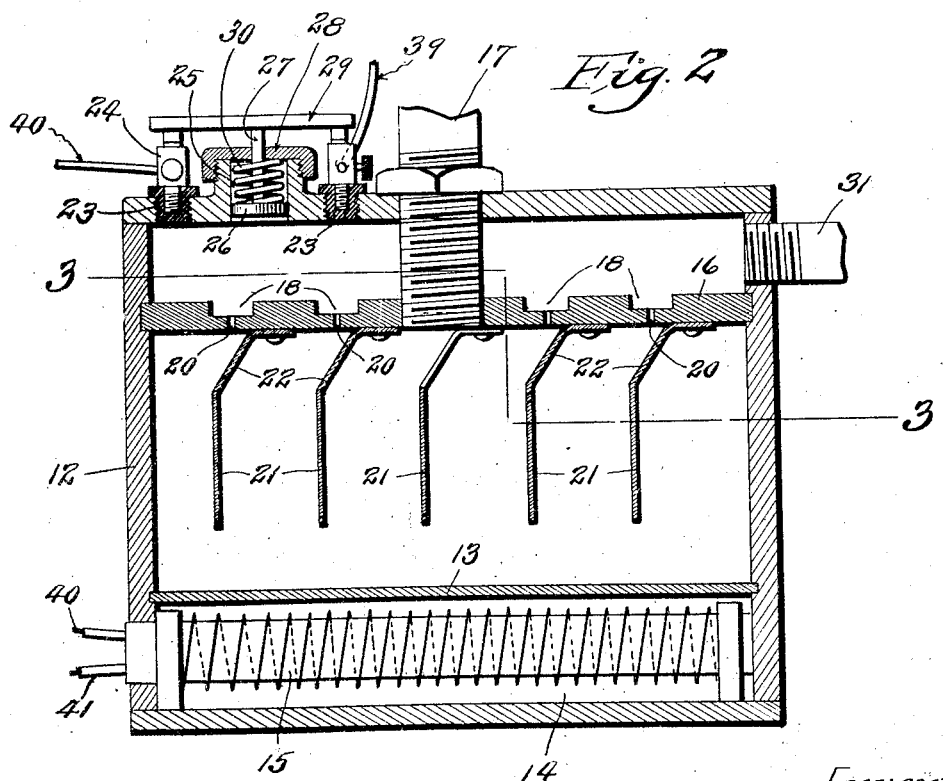
Inventor
James J. Rohan J. J. ROHAN.
ELECTRICALLY HEATED RADIATOR.
APPLICATION FILED MAR. 23, 1918.
1,276,573.
Patented Aug. 20, 1918.
2 SHEETS—SHEET 2.
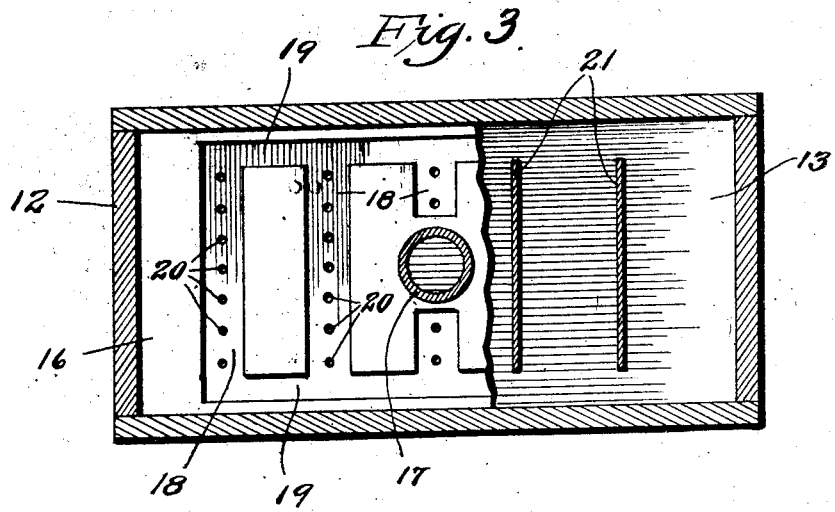
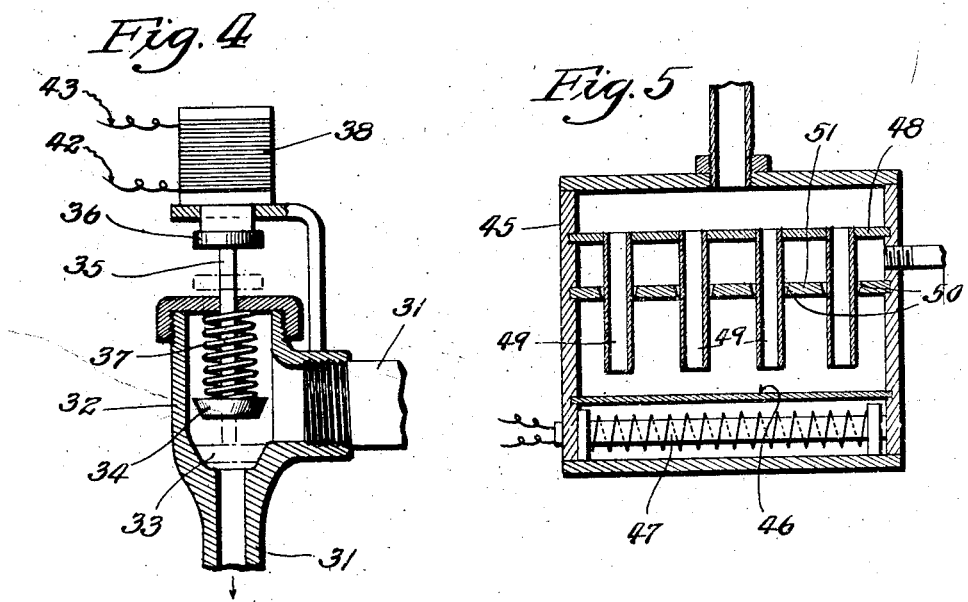
Inventor
James J. Rohan

UNITED STATES PATENT OFFICE.

JAMES J. ROHAN, OF ST. LOUIS, MISSOURI, ASSIGNOR OF ONE-HALF TO CHARLES E. MACK, OF ST. LOUIS, MISSOURI.

ELECTRICALLY-HEATED RADIATOR.

1,276,573.

Specification of Letters Patent.   Patented Aug. 20, 1918.

Application filed March 23, 1918.   Serial No. 224,201.

*To all whom it may concern:*

Be it known that I, JAMES J. ROHAN, a citizen of the United States, residing at St. Louis, Missouri, have invented a certain new and useful Improvement in Electrically-Heated Radiators, of which the following is a full, clear, and exact description, such as will enable others skilled in the art to which it appertains to make and use the same, reference being had to the accompanying drawings, forming part of this specification.

My invention relates to an electrically heated steam radiator, the principal objects of my invention being to provide a radiator of ordinary form with an electrically heated steam generator, which latter is comparatively rapid, efficient and economical in operation, and further, to provide simple and positively acting means for automatically controlling the flow of electric current to the heater and likewise for automatically controlling the flow of water of condensation from the radiator back to the heating device, such automatic control being effected through the medium of the steam pressure developed within the heating device.

With the foregoing and other objects in view, my invention consists in certain novel features of construction and arrangement of parts, hereinafter more fully described and claimed, and illustrated in the accompanying drawings, in which—

Figure 1 is an elevational view of an electrically heated steam generator of my improved construction.

Fig. 2 is a vertical section through the center of the electrically heated steam generator, forming a part of my invention.

Fig. 3 is a horizontal section taken approximately on the line 3—3 of Fig. 2.

Fig. 4 is an enlarged detail section of an electrically controlled water valve made use of between the radiator and the steam generator.

Fig. 5 is a vertical section of a modified form of the electrically heated steam generator.

Referring by numerals to the accompanying drawings which illustrate a practical embodiment of my invention, 10 designates a radiator which may be of any desired construction, preferably a series of connected sections mounted on suitable supports or legs 11 and arranged adjacent to this radiator is an electrically heated steam generator which is in effect a flash boiler. This part of my improved apparatus comprises a suitable housing 12 which is practically air-tight and arranged in the lower portion thereof is a relatively thin horizontally disposed plate 13. The chamber 14 below this plate is occupied by one or more electric heating coils 15, the terminals of which extend through one of the end walls of housing 12.

Located in the upper portion of the housing 12 is a horizontally disposed plate 16 through the center of which passes the lower end of a pipe or tubular member 17, the latter passing through the top of housing 12 and serving as a conduit for conveying the steam generated within the heater to the upper portion of the radiator 10.

Formed in the top of plate 16 is a series of transversely disposed shallow grooves 18, the ends thereof near the side walls of housing 12 being connected by longitudinally disposed grooves 19. Formed through the plate 16 within the transversely disposed grooves 18 are small apertures 20 which are arranged in rows and secured to the underside of plate 16 are the upper ends of spreader plates 21. The upper portions 22 of these plates are disposed directly beneath the transversely disposed rows of apertures 20 and the lower ends of said plates terminate in a plane a short distance above plate 13.

Seated in the top plate of housing 12 are plugs 23 of suitable insulating material and seated in said plugs are the lower ends of combined binding posts and contact members 24. Formed in the top plate of housing 12 between the plugs 23 is a small vertically disposed cylindrical chamber 25, the lower end of which communicates with the chamber in housing 12 and arranged to slide vertically within this cylindrical chamber is a piston 26. Secured to said piston is the lower end of a rod 27, the same being arranged for sliding movement through a cap or closure 28 for the upper end of chamber 25, and formed by the upper end of said rod 27 is a horizontally disposed metal plate 29, the ends of which are adapted to contact with the upper ends of members 24.

Interposed between piston 26 and cap 28 is a relatively light compression spring 30 which normally maintains the piston 26 in the lower portion of chamber 25 and likewise holds the ends of plate 29 in contact with members 24. Leading from the lower portion of radiator 10 to the chamber within housing 12 above plate 16 is a tubular connection 31 and connected thereto is a valve housing 32 in which is formed a valve seat 33. Adapted to rest on this seat is a valve 34, the same being carried by a stem 35 which projects through the top of housing 32 and carried by the upper end of said stem is a soft metal disk or plate 36 which performs the functions of an armature.

Interposed between valve 34 and the top of the housing 32 is a relatively light compression spring 37 which tends to normally hold valve 34 upon seat 33, thereby cutting off the flow of water of condensation from the radiator body to the electrically heated steam generator.

Arranged on a suitable support above the valve housing 32 is an electro-magnet 38, the core of which is disposed directly above the disk 36. Leading from a suitable source of electrical energy to one of the binding posts 24 is a conductor 39 and leading from the other binding post to one of the terminals of the heating coil 15 is a conductor 40. Leading from the other terminal of the heating coil to the source of electrical energy is a conductor 41. Leading from conductor 40 to one end of the coil of electro-magnet 38 is a conductor 42, and leading from the opposite end of said coil to conductor 41 is a conductor 43.

Water of condensation from the body of the radiator 10 enters the chamber within housing 12 above the plate 16 and said water flows through the grooves 18 and 19, and after passing through apertures 20 drops onto the inclined portions 22 of the spreader plates 21. This water flows downwardly over said plates in relatively thin films and finally drops onto plate 13. This plate is heated to a relatively high degree by the coil or coils 15, the latter being supplied with current through conductor 41, and as a result, the water is very rapidly converted into steam and the latter passes upwardly and is conveyed through pipe 17 to radiator 10.

Necessarily, the pressure in the chamber above plate 16 is the same as in the chamber between said plate and plate 13 and when a predetermined degree of pressure prevails, piston 26 is forced upward against the resistance offered by spring 30 with the result that plate 29 leaves contact members 24, thereby opening the circuit in which the heating coil is located and which circuit includes conductors 39, 40 and 41. Simultaneous with this opening of the main circuit, the flow of current through electromagnet 38 will be cut off with the result that spring 37 will act to position valve 34 upon its seat 33, consequently cutting off the flow of water of condensation from the radiator 10 to the steam generator. This condition will prevail until the temperature of the radiator lowers sufficiently to reduce the pressure within the steam generator, whereupon spring 30 will act to move piston 26 downward, and consequently moving plate 29 into contact with members 24, thereby closing the circuit to the heating coil 13. Simultaneous with this closing of the main circuit, electro-magnet 38 will be energized, with the result that disk 36, stem 35 and valve 34 will be elevated, thereby permitting the water of condensation to again flow from radiator to the steam generator. Thus the action of the steam generator is automatically controlled by the pressure within said generator. One end of the radiator is provided with a normally closed inlet opening or filling spout as shown in Fig. 1.

In Fig. 5 I have shown a modified form of the electrically heated steam generator, this construction including a housing 45 provided in its lower portion with a plate 46 below which is arranged the heating coil 47. Arranged in the upper portion of the housing is a plate 48 from which depends a series of open-ended tubes 49, the latter passing through conical apertures 50 in a plate 51, the latter being located a short distance below plate 48. Where this construction is provided, water enters the chamber between plates 48 and 51 and passing through the apertures 50 travels downward over the surface of the tubes 49 and drops therefrom onto plate 46 and as the water is converted into steam, the latter passes upward through pipes 49 and passes from the housing 45 to the radiator.

Radiators of my improved construction can be used wherever a suitable electric current is available and for household use the steam generator can be directly connected to the radiator, thereby enabling the latter to be readily moved from one point to another and positioned wherever desired.

The automatic control of the heating coil enables the radiator to be economically used, for by such control a sufficient degree of heat is obtained with a minimum consumption of electric current.

It will be readily understood that minor changes in the size, form and construction of the various parts of my improved radiator may be made and substituted for those herein shown and described, without departing from the spirit of my invention, the scope of which is set forth in the appended claims.

I claim:

1. The combination with a radiator, of an electrically heated steam generator associated with said radiator, said steam generator having a connection with a source of water supply, an electrically operated valve for controlling the passage of water through said connection, and means adapted to be actuated by the pressure developed within the steam generator for controlling the operation of the electric heater within said generator and for controlling the action of the electrically operated valve.

2. The combination with a radiator, of an electrically heated steam generator associated with said radiator, which steam generator is supplied with water of condensation from the radiator, and means adapted to be actuated by the pressure developed within the steam generator for controlling the flow of water of condensation from the radiator to the steam generator.

3. The combination with a radiator, of an electrically heated steam generator associated with said radiator, which steam generator receives water of condensation from the radiator, and means adapted to be actuated by the pressure developed within the steam generator for controlling the action of the electric heating medium associated with said generator and for controlling the passage of water of condensation from the radiator to said generator.

4. The combination with a radiator, of a steam generator, an electric heating coil associated with said generator, a steam connection from the generator to the radiator, a water connection from the radiator to the generator, a valve in said water connection, an electro-magnet for opening said valve, and electric connections to the heating coil and said electro-magnet.

5. The combination with a radiator, of a steam generator, an electric heating coil associated with said generator, a steam connection from the generator to the radiator, a water connection from the radiator to the generator, a valve in said water connection, an electro-magnet for opening said valve, and means adapted to be actuated by the pressure developed within the steam generator for controlling the action of the heating coil associated with said generator and for controlling the action of the electromagnet.

6. A steam generator for radiators comprising a housing, partitions arranged therein to form a heating compartment, a water compartment and a steam generating compartment, a heating coil in the heating compartment, there being apertures in the partition between the water compartment and steam generating compartment, and spreader plates within the steam generating compartment below said apertures.

7. An electrically heated steam generator for radiators comprising a housing, a partition therein, which partition divides the space within the housing into a heating compartment and a steam generating compartment, a heating coil in the compartment below said partition, means for delivering water onto the partition above the heating coil, electric connections to said heating coil, a switch in said connections, and means associated with said switch whereby the same is opened under pressure of the steam generated within the housing.

8. The combination with a radiator, of an electrically heated steam generator having a heating chamber, a steam generating chamber and a water circulating chamber, a tubular connection from the radiator to the water circulating chamber of the generator, and a tubular connection from the steam generating chamber within said generator to said radiator.

9. The combination with a radiator, of an electrically heated steam generator having a heating chamber, a steam generating chamber and a water circulating chamber, a tubular connection from the radiator to the water circulating chamber of the generator, a tubular connection from the steam generating chamber within said generator to said radiator, and means controlled by the pressure developed within the steam generator for controlling the action of the electric heating element associated with said generator.

10. The combination with a radiator, of an electrically heated steam generator having a heating chamber, a steam generating chamber and a water circulating chamber, a tubular connection from the radiator to the water circulating chamber of the generator, a tubular connection from the steam generating chamber within said generator to said radiator, and means adapted to be actuated by the pressure developed within the generator for controlling the flow of water through the tubular connection from the radiator to the water chamber within the generator.

In testimony whereof I hereunto affix my signature this 14th day of March, 1918.

JAMES J. ROHAN.